W. M. BROWN, E. B. ENTWISLE AND H. C. STIFF.
SWITCH ARM.
APPLICATION FILED JAN. 6, 1921.

1,373,406.

Patented Apr. 5, 1921.
4 SHEETS—SHEET 1.

INVENTORS
William M. Brown
Edward B. Entwisle
Henry C. Stiff
by D. Anthony Usina
atty.

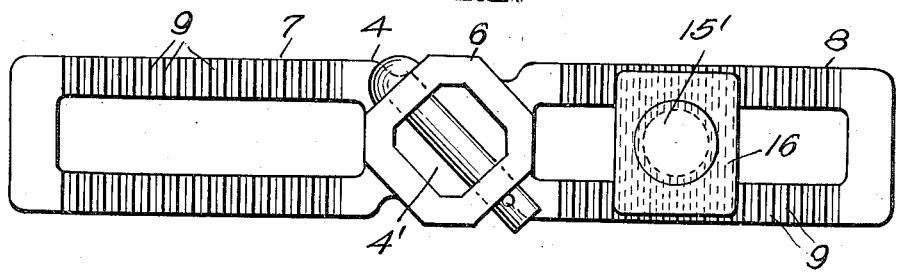
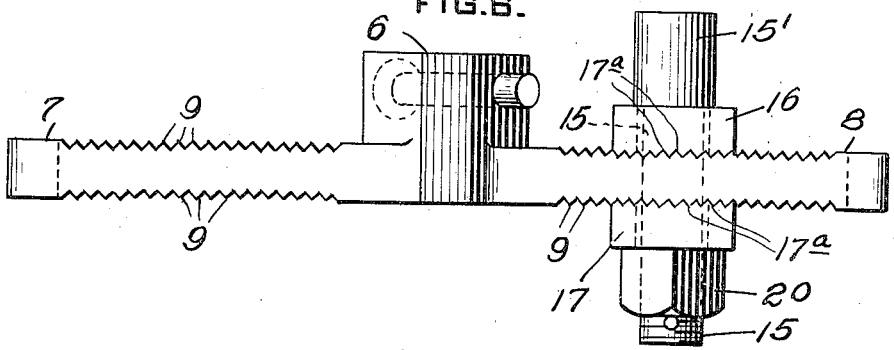
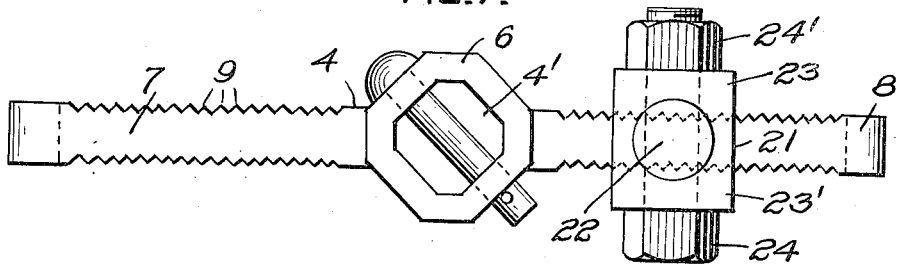
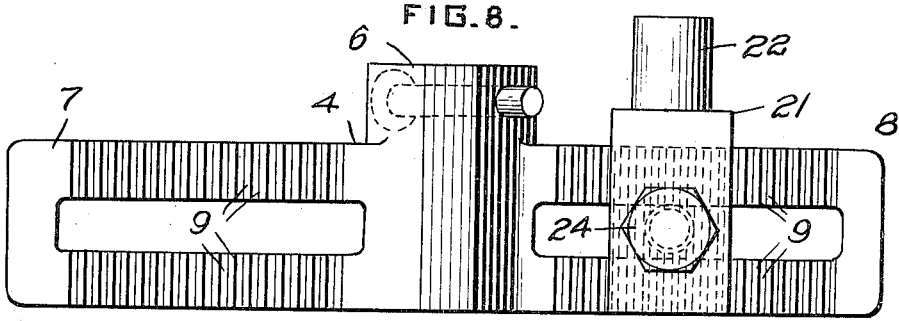

W. M. BROWN, E. B. ENTWISLE AND H. C. STIFF.
SWITCH ARM.
APPLICATION FILED JAN. 6, 1921.

1,373,406.

Patented Apr. 5, 1921.

INVENTORS
William M. Brown
Edward B. Entwisle
Henry C. Stiff
by D Anthony Usina
atty.

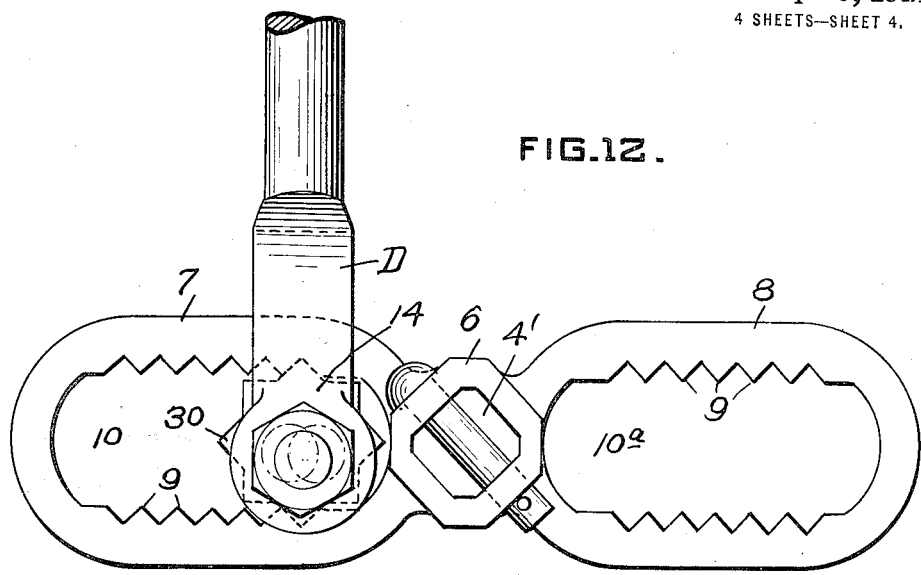
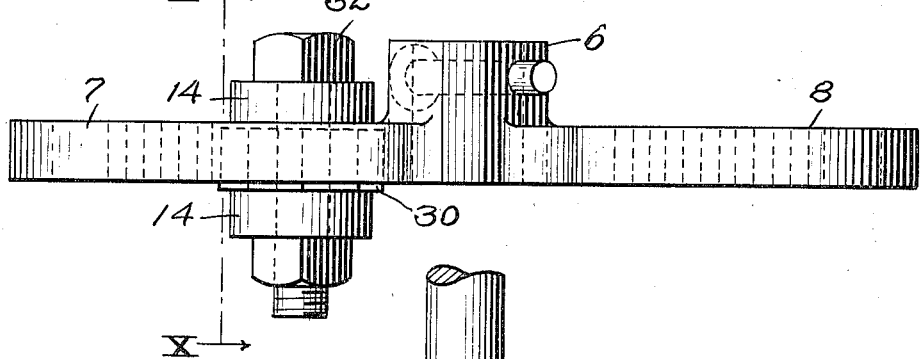
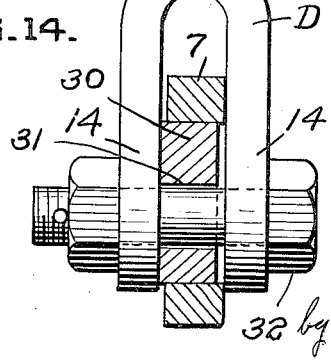

UNITED STATES PATENT OFFICE.

WILLIAM MILTON BROWN, EDWARD B. ENTWISLE, AND HENRY C. STIFF, OF JOHNSTOWN, PENNSYLVANIA.

SWITCH-ARM.

1,373,406.  Specification of Letters Patent.  Patented Apr. 5, 1921.

Application filed January 6, 1921. Serial No. 435,363.

*To all whom it may concern:*

Be it known that we, WILLIAM MILTON BROWN, EDWARD B. ENTWISLE, and HENRY C. STIFF, citizens of the United States, and residents of Johnstown, in the county of Cambria and State of Pennsylvania, have invented certain new and useful Improvements in Switch-Arms, of which the following is a specification.

This invention relates to new and useful improvements in switch stands, and more particularly to adjustable cranks for switch stands, and has for one of its objects, the provision of such a crank that will have a wide area of adjustment.

Another object is to provide such levers with means whereby a finer degree of adjustment may be obtained, than heretofore.

A further object is to provide an adjustment that will have a positive lock, will be simple, efficient and durable.

Other objects and advantages will be more fully brought out in the following specification and claims, and illustrated in the accompanying drawings, in which—

Fig. 5 is a top plan view of another form of crank arm having the top and bottom faces serrated and a stub bearing thereon to receive the switch rod link.

Fig. 6 is a side elevation thereof.

Fig. 7 is a top plan view of another form of crank arm having its side faces serrated and a stub bearing secured thereon.

Fig. 8 is a side elevation thereof.

Fig. 12 is a top plan view of still another design of crank arm having a bearing within a serrated slot adapted to carry a switch rod link.

Fig. 13 is a side elevation of the form of arm shown in Fig. 12.

Fig. 14 is a sectional end elevation on the line X—X of Fig. 13.

Figure 1:
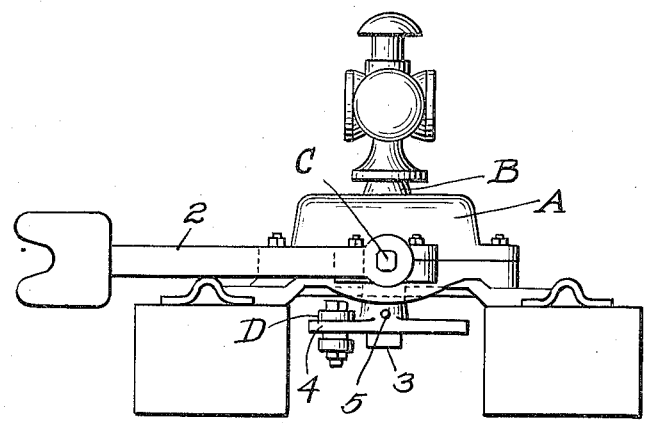
Figure 1 is a front elevation of a switch stand showing one of our improved crank arms in position.

In the drawings, A is the switch stand provided with the usual vertical target shaft B, which is connected in any well known manner to the right angle shaft C which is connected with switch lever 2.

The lower end of the target shaft B, is provided with the squared head 3 having an aperture therein, and is adapted to receive a double crank arm 4 which is secured in position by a pin 5.

Crank arms 4 are adapted to carry the switch rod link D in various adjustable positions as will hereinafter be described in detail for each of the designs shown.

Figure 2:
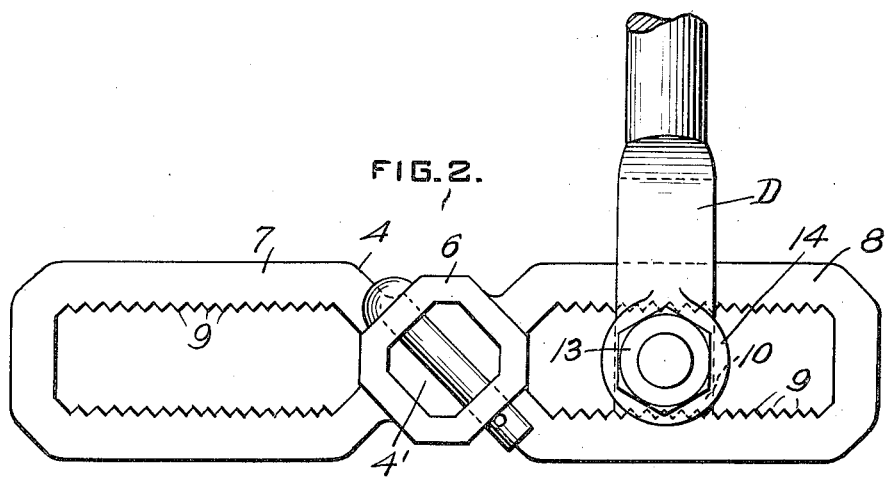
Fig. 2 is a top plan view of one form of crank arm having a bearing in the serrated slot to receive the switch rod link.
Figure 3:
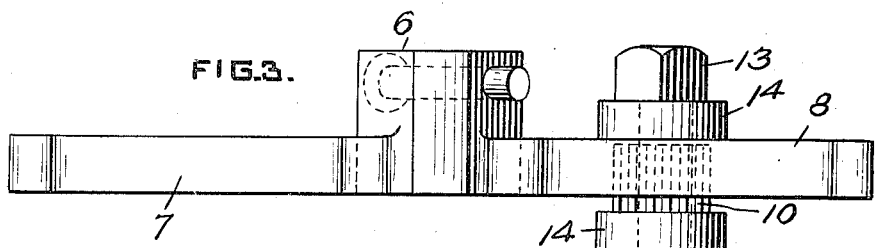
Fig. 3 is a side elevation thereof.
Figure 4:
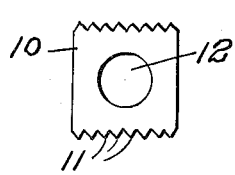
Fig. 4 is a side elevation of the bearing member of Fig. 2.

In Figs. 2 to 4, we have shown a crank arm 4 comprising a shank portion 6 having a squared aperture 4' therein, and having rectangular shaped centrally slotted arms 7 and 8 which have the inner longitudinal faces of the slotted portion provided with serrations 9. A square bushing bearing member 10 is adapted to fit within the recessed portion of the arms 7 and 8 and has coöperating serrations 11 adapted to lock with the serrations 9. The bearing member 10 is centrally apertured as at 12 to receive bolt 13 which passes through the ears 14 of the switch rod link D.

In Figs. 5 and 6, we have shown another design of crank arm 4 embodying the same general features as the first, and comprising a shank portion 6 having a squared aperture 4' therein and having rectangular shaped centrally slotted arms 7 and 8 having their flat top and bottom faces provided with serrations 9. A stub bearing member 15 is adapted to pass through the recess in the arms 7 and 8 and carries plates 16 and 17, each having one of its faces provided with serrations 17ª to coöperate with the serrations 9 on the arms 7 and 8. The stub bearing 15 and disks 16 and 17 are held in position by nut 20, screw threaded on the lower end of the member 15. The bearing 15 is provided with a stub portion 15' adapted to carry the switch rod link D.

In Figs. 7 and 8, we have shown a still different design of crank arm 4 embodying our invention, and being generally similar to the designs heretofore described, it is provided with the shank 6 having apertures 4', and has rectangular shaped centrally slotted arms 7 and 8, although the arms 7 and 8 of this design have narrow top and bottom faces and broad side faces, that is, they are substantially rectangular and have a materially greater dimension from top to bottom than from side to side and the side faces of the arms are provided with serrations 9. A stub bearing member 21 comprising a bearing portion 22 and jaws 23 and 23' is adapted to be carried by the arms 7 and 8. The jaws 23 and 23' of the member 22 have their inner faces serrated to coöperate with the serrations 9 on the side faces of the arms 7 and 8, and the whole stub member is adapted to be locked in position by a bolt 24 which passes through the jaws 23 and 23', and through the recess in the arms and is secured in position by a nut 24'. The stub bearing 21 is adapted to carry the switch rod link D on its portion 22.

Figure 9:
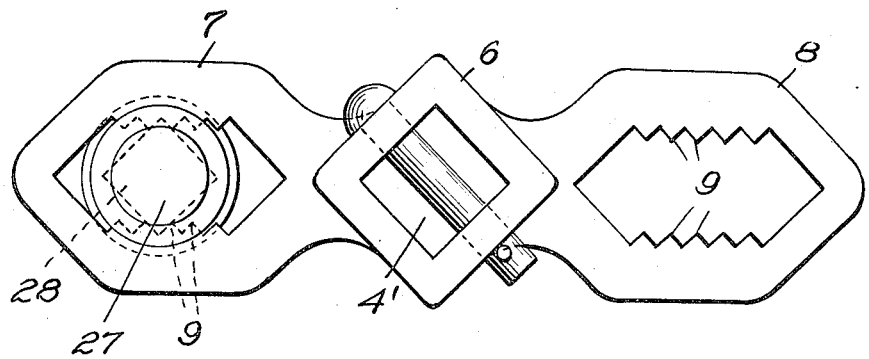
Fig. 9 is a top plan view of still another form of crank arm having a novel bearing within a serrated slot adapted to carry a stub bearing.
Figure 10:
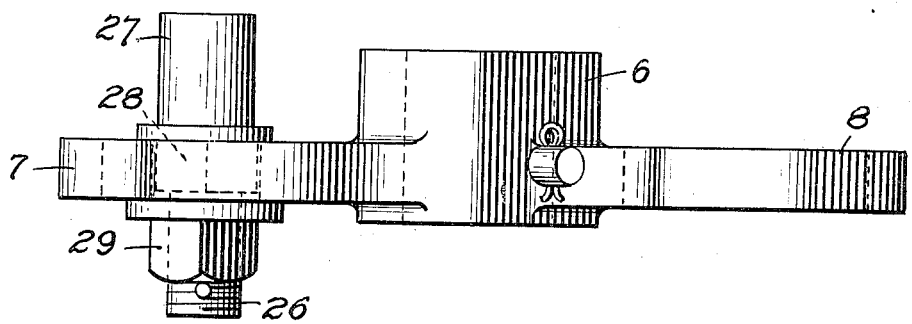
Fig. 10 is a side elevation.
Figure 11:
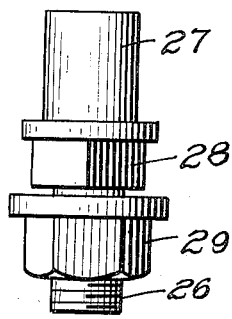
Fig. 11 is a detail view of the stub bearing of Figs. 9 and 10 and its associated parts.

In Figs. 9 to 11, we have shown still another design of crank arm 4 which embodies our invention and comprises a shank 6 having aperture 4' and substantially rectangular centrally slotted arms 7 and 8, although the arms taper at their ends, also the recesses follow this same taper, and are provided with serrations 9 on their side walls.

The stub bearing 26 is adapted to fit within the slots of arms 7 and 8, and is provided with a bearing portion 27 and a squared locking block 28. The block 28 is adapted to fit within the slots of arms 7 and 8 and is of such size that its greatest dimension from one corner to the extreme opposite corner is equal to the distance between the lowest points of the serrations 9 on the opposite sides of the slots 7 and 8. Therefore, the bearing 26 may be locked in position against longitudinal movement along the slotted arms. The lower end of the bearing 26 has a nut 29 screw threaded thereon to secure it in position.

The switch rod link D is adapted to be mounted on the bearing portion 27 of stub bearing 26.

In Figs. 12 to 14, is shown a still further design of crank 4 comprising the usual shank 6 having aperture 4' and substantially rectangular arm members 7 and 8 slotted as at 10ª and provided with serrations 9 on the inner longitudinal edges of the recess. A bearing or block 30 is adapted to be held in slots 10ª and coöperate with the serrations 9. The member 30 is in the form of a double square or eight pointed star, and the pitch of the points of this member is the same as the pitch of the serrations 9, the points being adapted to engage with the serrations to lock the member in place. An aperture 31 is provided in the bearing 30 off the center to receive a bolt 32 which carries the switch rod link D, which is provided with enlarged ears 14, through which the bolt 32 passes. The ears 14 are of greater diameter than the member 30 and bear against the sides of the arms 7 and 8. By the combined longitudinal and rotary adjustment of the member 30, a finer adjustment may be had than with the other constructions shown.

The general operation of all of the numerous designs is the same. In order to get a different leverage on the switch rod link D, it is adjusted backward or forward on the arms 7 or 8 by moving the different parts relative to the serrations.

The principal advantage of this invention is the provision of a positive locking adjustable leverage connection between the crank arm 4 and the switch rod link D, and various ways are shown in the drawings and described in the specification of accomplishing this result, although we do not wish to be limited to the constructions shown since they are only illustrative of our invention, and various other modifications may be made within the scope of the appended claims without departing from the spirit of the invention.

We claim:—

1. The combination with a switch stand having a vertical shaft, of a crank arm secured to the lower end thereof, having a plurality of serrations thereon, and a switch rod link adjustably clamped to said arm.

2. The combination with a switch stand having a vertical shaft, of a crank arm secured to the lower end thereof, having a slot formed therein, serrated faces formed on said crank arm, and a switch rod link having serrated portions adapted to coöperate with said serrated portions of said crank arm, said link being removably secured to said crank arm.

3. The combination with a switch stand having a vertical shaft, of a crank arm secured to the lower end thereof, having a longitudinal slot therein, serrations on said crank arm, and a switch rod link adapted to be clamped to said crank arm, said switch rod link being provided with serrations adapted to coöperate with the serrations on said crank arm to prevent movement of said switch rod link relative to said crank arm.

4. The combination with a switch stand having a vertical shaft, of a crank arm removably secured to the lower end of said shaft, a switch rod link pivotally connected to said crank arm, and means for adjustably locking said pivotal connection in different adjusted positions on either end of said crank arm.

5. The combination with a switch stand having a vertical shaft, of a crank arm removably secured to the lower end of said shaft, a switch rod link pivotally connected to said crank arm, said pivotal connection comprising a bearing member adapted for longitudinal locking adjustment with said crank arm and adapted to carry said switch rod link.

6. The combination with a switch stand having a vertical shaft, of a crank arm removably secured to the lower end of said shaft, said crank arm being provided with a longitudinal slot, serrations on the inner faces of said slot, a bearing member mounted within said slot provided with serrations adapted to engage and lock with said first named serrations, and a switch rod link pivotally connected with said bearing.

7. The combination with a switch stand having a vertical shaft, of a double end crank arm removably secured to the lower end of said shaft, said crank arm being provided with a longitudinal slot, serrations on the inner faces of said slot, a bearing member mounted within said slot, and in locked engagement with said serrations, and a switch rod link pivotally connected with said bearing.

8. The combination with a switch stand having a vertical shaft, of a double end crank arm removably secured to the lower end of said shaft, said crank arm being provided with longitudinal slots, serrations on said crank arm, a bearing member mounted on said arm and provided with serrations adapted to engage and lock with said serrations on said arm, and a switch rod link pivotally mounted on said bearing.

In testimony whereof we have hereunto set our hands.

WILLIAM MILTON BROWN.
EDWARD B. ENTWISLE.
HENRY C. STIFF.